(12) United States Patent
Sanelle et al.

(10) Patent No.: US 7,649,577 B2
(45) Date of Patent: Jan. 19, 2010

(54) SUPER BRIGHT LOW REFLECTANCE LIQUID CRYSTAL DISPLAY

(76) Inventors: Joseph J. Sanelle, 293 Turnpike Rd., #610, Westboro, MA (US) 01581; Diggy R. Breiling, 12935 SW. Barberry Dr., Beaverton, OR (US) 97008; Daniel R. Doyle, 6 Stoney Ridge Rd., Medway, MA (US) 02053

( * ) Notice: Subject to any disclaimer, the term of this patent is extended or adjusted under 35 U.S.C. 154(b) by 0 days.

(21) Appl. No.: 11/901,395

(22) Filed: Sep. 16, 2007

(65) Prior Publication Data

US 2008/0007675 A1    Jan. 10, 2008

Related U.S. Application Data

(60) Division of application No. 11/209,102, filed on Aug. 22, 2005, now Pat. No. 7,405,779, which is a continuation of application No. 09/772,197, filed on Jan. 29, 2001, now Pat. No. 6,933,991, which is a continuation-in-part of application No. 09/235,584, filed on Jan. 22, 1999, now Pat. No. 6,181,394.

(51) Int. Cl.
*G02F 1/1335* (2006.01)

(52) U.S. Cl. .............................. 349/12; 349/96; 349/117

(58) Field of Classification Search ................... 349/12, 349/96, 117
See application file for complete search history.

(56) References Cited

U.S. PATENT DOCUMENTS 3,869,196 A    3/1975    Kubota (Continued)

FOREIGN PATENT DOCUMENTS

EP    0 502 364 A1    9/1992

(Continued)

OTHER PUBLICATIONS

Bahadur, Liquid Crystals 1990, World Scientific, vol. 1, pp. 173-193.

*Primary Examiner*—David Nelms
*Assistant Examiner*—David Y Chung
(74) *Attorney, Agent, or Firm*—Alleman Hall McCoy Russell & Tuttle LLP

(57) ABSTRACT

A liquid crystal display (LCD) exhibiting enhanced optical viewing performance. In a preferred embodiment, the LCD comprises a liquid crystal display panel, the liquid crystal display panel comprising a pair of transparent substrates, liquid crystal material sandwiched between the transparent substrates and transparent electrodes positioned between the liquid crystal material and the transparent substrates. The LCD also comprises a rear polarizer assembly comprising a compensation film, a polarizer mounted on the rear surface of the compensation film, and a first index-matched, pressure sensitive adhesive (PSA) mounted on the front surface of the compensation film, the PSA being adhered to the rear surface of the LCD panel. The LCD also comprises a front polarizer assembly, the front polarizer assembly comprising a front polarizer, a compensation film mounted on the rear surface of the front polarizer and an index-matched PSA mounted on the front surface of the front polarizer. The front polarizer is crossed relative to the rear polarizer. The front polarizer assembly may be adhered to the front of the LCD panel with a second index-matched, optical bonding material or may be spaced therefrom by an air gap. A transparent cover is mounted on the second index-matched PSA. The transparent cover is preferably a plastic plate. The plastic plate may be textured to reduce glare or may have an anti-reflection coating or an anti-reflection film applied to the front surface thereof. Instead of a plastic plate, the transparent cover may be a glass plate or a touch panel.

7 Claims, 4 Drawing Sheets

U.S. PATENT DOCUMENTS

| | | | |
|---|---|---|---|
| 4,657,348 A | 4/1987 | Ziegler | |
| 4,723,836 A | 2/1988 | Kono et al. | |
| 4,889,412 A | 12/1989 | Clerc et al. | |
| 5,018,837 A | 5/1991 | McKee et al. | |
| 5,148,299 A | 9/1992 | Terada | |
| 5,179,457 A | 1/1993 | Hirataka et al. | |
| 5,430,607 A | 7/1995 | Smith | |
| 5,523,873 A | 6/1996 | Bradford, III et al. | |
| 5,570,214 A | 10/1996 | Abileah et al. | |
| 5,579,139 A | 11/1996 | Abileah et al. | |
| 5,594,568 A | 1/1997 | Abileah et al. | |
| 5,706,068 A | 1/1998 | Abileah et al. | |
| 5,739,881 A | 4/1998 | Xu et al. | |
| 5,774,107 A | 6/1998 | Inou | |
| 5,808,713 A | 9/1998 | Broer et al. | |
| 5,818,559 A | 10/1998 | Yoshida | |
| 5,867,241 A | 2/1999 | Sampica et al. | |
| 5,880,800 A | 3/1999 | Mikura et al. | |
| 5,926,241 A * | 7/1999 | Gunning, III | 349/117 |
| 6,020,945 A * | 2/2000 | Sawai et al. | 349/119 |
| 6,181,394 B1 | 1/2001 | Sanelle et al. | |
| 6,281,952 B1 | 8/2001 | Okamoto et al. | |
| 6,369,865 B2 | 4/2002 | Hinata | |
| 6,392,727 B1 | 5/2002 | Larson et al. | |
| 6,572,941 B1 | 6/2003 | Murakami et al. | |
| 6,933,991 B2 | 8/2005 | Sanelle et al. | |

FOREIGN PATENT DOCUMENTS

| | | |
|---|---|---|
| JP | A-3-16128 | 2/1991 |
| JP | A-4-13981 | 2/1992 |
| JP | A-5-069171 | 3/1993 |
| JP | A-5-127822 | 5/1993 |
| JP | A-5-173707 | 7/1993 |
| WO | WO 93/08489 A1 | 4/1993 |
| WO | WO 00/43832 A1 | 7/2000 |

\* cited by examiner

SUPER BRIGHT LOW REFLECTANCE LIQUID CRYSTAL DISPLAY

CROSS-REFERENCE TO RELATED APPLICATIONS

The present application is a divisional of U.S. patent application Ser. No. 11/209,102, inventors Sanelle et al., filed Aug. 22, 2005 now U.S. Pat. No. 7,405,779, which in turn is a continuation of U.S. patent application Ser. No. 09/772,197, inventors Sanelle et al., filed Jan. 29, 2001, now U.S. Pat. No. 6,933,991, which in turn is a continuation-in-part of U.S. patent application Ser. No. 09/235,584, inventors Sanelle et al., filed Jan. 22, 1999, now U.S. Pat. No. 6,181,394, the disclosures of which are incorporated herein by reference.

BACKGROUND OF THE INVENTION

The present invention relates generally to liquid crystal displays and more particularly to an improved liquid crystal display exhibiting enhanced optical viewing performance.

Liquid crystal displays, which were first introduced in the 1970's and have since been used in watches, clocks, pocket calculators, portable personal computers, navigational instruments and the like, are electronically switched displays that make use of changes in the reflective properties of liquid crystals present in an electric field. A typical liquid crystal display comprises a liquid crystal display panel (also commonly referred to as a liquid crystal display cell), said panel comprising a thin film of liquid crystals sandwiched between a pair of transparent substrates, each of the transparent substrates typically having a transparent electrically conductive coating applied to the liquid crystal side thereof, said transparent coating functioning as an electrode. The liquid crystal display panel is typically positioned between a pair of glass (or other transparent) cover plates, the cover plates being sealed together around their respective edges. The cover plates may be assembled with spacers between them to maintain a constant separation distance. Two crossed axis polarizers are positioned between the cover plates, one polarizer being adhered to the front of the liquid crystal display panel and the other polarizer being adhered to the rear of the liquid crystal display panel. When a voltage is applied selectively across the electrodes, the liquid crystal molecules between them are rearranged or switched in polarization so that light is either reflected or absorbed in the region bounded by the electrodes to form characters or graphics. Many liquid crystal displays include a backlight for night or dark viewing, and many liquid crystal displays include a layer of indium tin oxide or another suitable material positioned between the front polarizer and the front cover plate for use as an electromagnetic interference shield. Some liquid crystal displays intended for use in cold environments also include a layer of indium tin oxide or another suitable material positioned between the rear polarizer and the rear cover plate and electrically connected to a power source for use as a heating element.

Some of the advantages of liquid crystal displays, as compared to other digital displays, are their comparatively low voltage and power requirements. Unfortunately, however, one of the principal disadvantages of liquid crystal displays is that, due to their low contrast and a "washed-out" effect caused by back-reflected ambient light seen by a viewer, they cannot easily be read under high ambient light conditions, such as when placed in direct sunlight.

One approach which has been taken to improve the viewing performance of liquid crystal displays, particularly when viewed under high ambient light conditions, has been to apply an anti-reflection coating to the front of the front cover plate. Although such an approach has provided some improvement to the viewing characteristics of liquid crystal displays by reducing the amount of back-reflected light seen by the viewer, further improvement is greatly needed.

A few patents in the field of liquid crystal display technology are described below.

In U.S. Pat. No. 5,818,559, inventor Yoshida, which issued Oct. 6, 1998, there is disclosed a liquid crystal display having different linear expansion coefficients among the materials of the display. More specifically, the liquid crystal display comprises a liquid crystal cell and a polarizing sheet stuck with an adhesive layer, said cell comprising a liquid crystal interposed between a pair of resinous substrates, at least one of which has a transparent electrode, and said polarizing sheet comprising a polarizing film interposed between a pair of resinous protective films, wherein difference in a linear expansion coefficient between the resin of the substrate facing the polarizing sheet and the resin of the protective film facing the liquid crystal cell is less than $0.5 \times 10^{-5}/°$ C.

In U.S. Pat. No. 5,523,873, inventors Bradford, III et al., which issued Jun. 4, 1996, and which is incorporated herein by reference, there is disclosed a liquid crystal display comprising first and second polarizers sandwiching a liquid crystal layer therebetween, electrode means for applying a voltage across the liquid crystal layer, and a heater disposed adjacent (directly or otherwise) the first polarizer, the heater comprising a conductive layer having a substantially planar flex circuit buss bar disposed thereon, the buss bar for delivering power to the conductive layer, thereby enabling the conductive layer to heat the liquid crystal display.

In U.S. Pat. No. 3,869,196, inventor Kubota, which issued Mar. 4, 1975, and which is incorporated herein by reference, there is disclosed a liquid crystal display device wherein the thickness and the loss of light by reflection are said to be decreased by using one surface from each of a polarizer and an analyzer for forming a cell in which the liquid crystal material is confined.

Other patents of interest include U.S. Pat. No. 5,179,457, inventors Hirataka et al., which issued Jan. 12, 1993; U.S. Pat. No. 5,430,607, inventor Smith, issued Jul. 4, 1995; U.S. Pat. No. 5,570,214, inventors Abileah et al., which issued Oct. 29, 1996; U.S. Pat. No. 5,594,568, inventors Abileah et al., which issued Jan. 14, 1997; U.S. Pat. No. 5,706,068, inventors Abileah et al., which issued Jan. 6, 1998; and U.S. Pat. No. 5,739,881, inventors Xu et al., which issued Apr. 14, 1998, all of which are incorporated by reference.

SUMMARY OF THE INVENTION

It is an object of the present invention to provide a novel liquid crystal display.

It is another object of the present invention to provide a liquid crystal display that ameliorates at least some of the problems discussed above in connection with existing liquid crystal displays.

It is yet another object of the present invention to provide a liquid crystal display as described above that includes a novel optical filtering arrangement.

The present invention is based, in part, on the innovative discovery that the amount of back-reflected light seen by a viewer of a liquid crystal display can be substantially reduced and, therefore, that the viewing characteristics of a liquid crystal display can be substantially improved by moving the front polarizer from its conventional location where it is adhered to the front surface of the liquid crystal display panel and is positioned rearwardly relative to the front cover plate to a new location where it is positioned in front of said front cover plate and is preferably adhered to the back surface of an additional cover plate itself positioned in front of said front cover plate.

Therefore, according to one aspect of the invention, there is provided a liquid crystal display comprising (a) a first transparent plate; (b) a second transparent plate; (c) a liquid crystal display panel positioned between said first and second transparent plates, said liquid crystal display panel comprising a first transparent substrate, a second transparent substrate, liquid crystal material positioned between said first and second transparent substrates, a first transparent electrode positioned between said liquid crystal material and said first transparent substrate, and a second transparent electrode positioned between said liquid crystal material and said second transparent substrate; (d) a rear polarizer positioned between said liquid crystal display panel and said second transparent plate; and (e) a front polarizer positioned in front of said first transparent plate, said front polarizer being crossed relative to said rear polarizer.

In a first preferred embodiment, the first and second transparent plates are made of glass, and the liquid crystal display panel is an active matrix liquid crystal display panel. In addition, the rear polarizer is a non-compensated linear polarizer, the front surface of which is adhered to the rear surface of the active matrix liquid crystal display panel with an index-matched, pressure sensitive adhesive. The display further comprises an indium tin oxide thin film coating adapted to be used as a heating element, said coating being applied to the front surface of the second glass plate. The front surface of said heating element is adhered to the rear surface of the rear polarizer with a silicone-based, index-matched, optical bonding material.

Said liquid crystal display further comprises an indium tin oxide thin film coating usable as an electromagnetic interference (EMI) shield, said coating being applied to the rear surface of the first glass plate. The rear surface of said EMI-coated glass substrate is adhered to the front surface of the active matrix liquid crystal display panel with the above-mentioned silicone-based, index-matched, optical bonding material.

The front polarizer is also a non-compensated linear polarizer, the front surface of which is adhered to a third glass plate with an index-matched, pressure sensitive adhesive and the rear surface of which is adhered to the front surface of the first glass plate by a layer of the above-mentioned silicone-based, index-matched, optical bonding material. The display further includes an anti-reflection (AR) thin film coating applied to the front surface of the third glass plate.

In order to minimize the reflection of ambient light by the display into the view of an observer, the various elements of the display preferably have respective indices of refraction that differ as minimally as possible.

A second preferred embodiment differs from the first preferred embodiment in that a first compensation film is interposed between the front polarizer and the index-matched optical bonding material used to bond the front polarizer to the first glass plate, and a second compensation film is interposed between the rear polarizer and the index-matched pressure-sensitive adhesive used to adhere the rear polarizer to the liquid crystal display panel.

A third preferred embodiment differs from the first preferred embodiment in that the following items are omitted: the EMI shield, the first glass plate, the optical bonding material used to bond the front polarizer to the first glass plate, the heating element, the second glass plate and the optical bonding material used to bond the rear polarizer to the heating element. In addition, the third glass plate may be a plastic plate.

A fourth preferred embodiment differs from the third preferred embodiment in that the optical bonding material used to bond the front polarizer to the liquid crystal display is replaced with an air gap.

A fifth preferred embodiment differs from the third preferred embodiment in that the anti-reflection coating is applied to the front surface of a thin film, the rear surface of said thin film being adhered to the front surface of the plastic plate by an index-matched pressure sensitive adhesive.

A sixth preferred embodiment differs from the third preferred embodiment in that the plastic plate is replaced with a touch panel.

Additional embodiments can be derived from a combination of the embodiments disclosed above.

The terms "front," "in front of," "front surface" or the like, when used herein to describe an element of a liquid crystal display or to denote the relative positions of two or more elements of a liquid crystal display, refer directionally to the viewer side of the liquid crystal display. The terms "behind," "in back of," "rear surface" or the like, when used herein to describe an element of a liquid crystal display or to denote the relative positions of two or more elements of a liquid crystal display, refer directionally to the side of the liquid crystal display facing away from the viewer, typically the backlight side of the display.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawing, which is hereby incorporated into and constitutes a part of this specification, illustrates a preferred embodiment of the invention and, together with the description, serves to explain the principles of the invention. In the drawing wherein like reference numerals represent like parts.

DETAILED DESCRIPTION OF PREFERRED EMBODIMENTS

As noted above, the present invention is directed to the problem of poor viewing performance or "washout" in liquid crystal displays, said problem occurring most notably under high ambient light conditions. More specifically, the problem is caused by the reflection of ambient light by the liquid crystal display back towards the viewer, thereby obscuring the image generated by the liquid crystal display. Moreover, in those instances in which the liquid crystal display includes an electromagnetic interference shield, often in the form of an indium tin oxide coating applied to the rear surface of the front cover plate of the display, the problem of ambient light reflection into the view of an observer is made even more acute.

Figure 1:
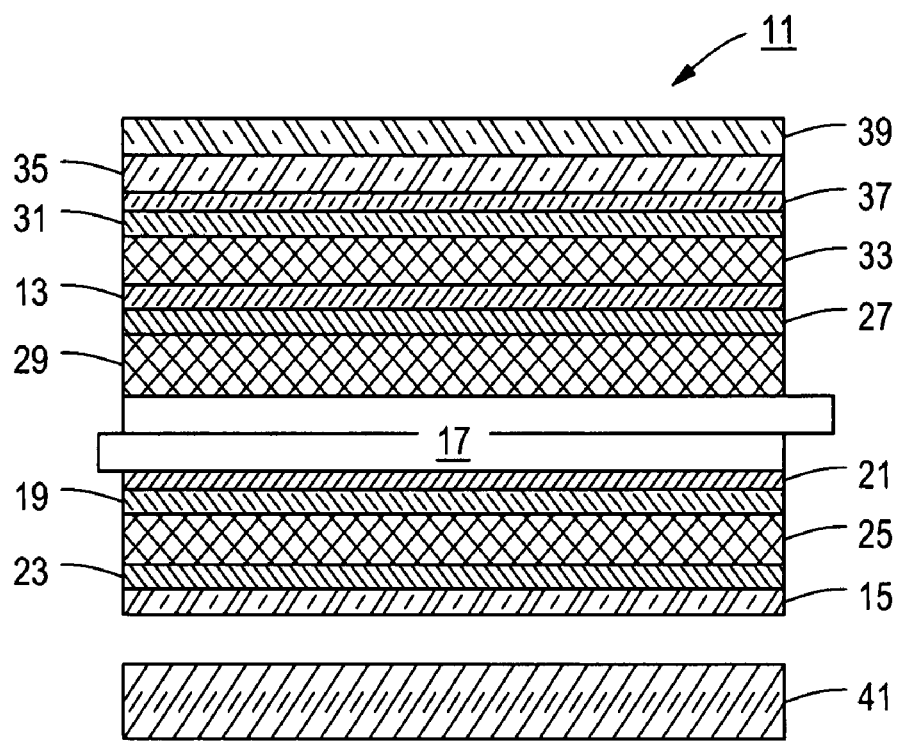
FIG. 1 is a schematic section view of a first embodiment of a liquid crystal display constructed according to the teachings of the present invention.

Referring now to FIG. 1, there is shown a schematic section view of a first embodiment of a liquid crystal display constructed according to the teachings of the present invention, said liquid crystal display being represented generally by reference numeral 11.

Liquid crystal display 11, which is particularly well-suited for (but is not limited to) military applications, comprises a first glass substrate 13, a second glass substrate 15 and a liquid crystal display (LCD) panel 17, LCD panel 17 being positioned between glass substrates 13 and 15. Glass substrates 13 and 15, which may be conventional in nature and correspond to the front and rear cover plates of a conventional liquid crystal display, typically have a thickness of about 0.04 inch and may be made of a borosilicate, a sodalime or the like. Preferably, glass substrates 13 and 15 have indices of refraction that substantially match that of LCD panel 17. LCD panel 17, which is preferably (but not necessarily) an active matrix liquid crystal display (AMLCD) panel, may be conventional in nature.

Figure 2:
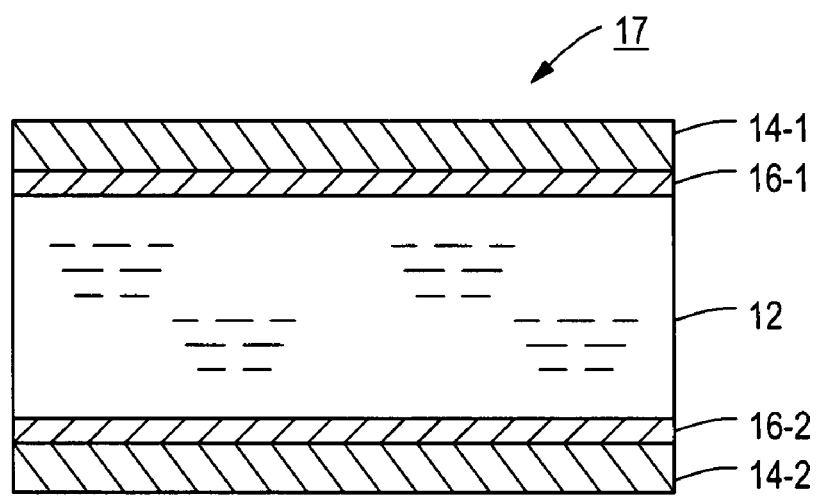
FIG. 2 is a schematic section view of the liquid crystal display panel of the liquid crystal display of FIG. 1.

As shown in FIG. 2, LCD panel 17 typically includes a layer 12 of liquid crystals sandwiched between a pair of transparent plates 14-1 and 14-2, the inner surfaces of plates 14-1 and 14-2 being coated with a transparent conductive coating used to form transparent electrodes 16-1 and 16-2, respectively.

Referring back to FIG. 1, display 11 also comprises a rear polarizer 19, rear polarizer 19 preferably having an index of refraction that substantially matches that of LCD panel 17. The front surface of rear polarizer 19 is preferably adhered to the rear surface of LCD panel 17 with a layer 21 of a conventional index-matched, pressure sensitive adhesive (layer 21 being about 0.001 inch in thickness). Rear polarizer 19 may be, for example, a conventional non-compensated linear polarizer, and layer 21 may be applied to polarizer 19 by the polarizer's manufacturer so that polarizer 19 and layer 21 form a polarizer assembly.

In addition, display 11 preferably comprises a thin film coating 23 applied to the front surface of second glass substrate 15. Coating 23, whose index of refraction substantially matches that of glass substrate 15, is preferably made of indium tin oxide or another suitable material so that, when coupled to a power source, coating 23 serves as a heating element to heat display 11 when it is used in cold ambient temperature conditions. The front surface of coating 23 is preferably adhered to the rear surface of rear polarizer 19 with a layer 25 of an index-matched, optical bonding material. Layer 25, which may be made of, for example, a silicone-based or epoxy-based, index-matched, optical bonding material, eliminates any air gap between rear polarizer 19 and coating 23.

Display 11 preferably further comprises an electromagnetic interference (EMI) shield 27. EMI shield 27, which is preferably in the form of an indium tin oxide thin film coating applied to the rear surface of first glass substrate 13, shields LCD panel 17 from incoming electromagnetic radiation by absorbing said radiation. EMI shield 27 preferably has an index of refraction that substantially matches that of LCD panel 17, and the rear surface of EMI shield 27 is preferably adhered to the front surface of LCD panel 17 with a layer 29 of the above-mentioned index-matched, optical bonding material.

Display 11 also comprises a front polarizer 31, front polarizer 31 being similar to rear polarizer 19 but crossed relative thereto. Front polarizer 31 preferably has an index of refraction substantially matching that of first glass substrate 13, and the rear surface of front polarizer 31 is preferably adhered to the front surface of first glass substrate 13 by a layer 33 of the above-mentioned index-matched, optical bonding material.

Display 11 additionally comprises a third glass substrate 35, which may be identical in composition to glass substrates 13 and 15. Third glass substrate 35 preferably has index of refraction substantially matching that of front polarizer 31, and the rear surface of third glass substrate 35 is preferably bonded to the front of front polarizer 31 by a layer 37 of the above-mentioned index-matched, pressure sensitive adhesive. (Layer 37 may be applied to polarizer 31 by the polarizer's manufacturer to form a polarizer assembly.) The peripheries of first glass substrate 13, second glass substrate 15 and third glass substrate 35 are preferably externally sealed to contain those elements of display 11 sandwiched therebetween.

Display 11 further includes a conventional anti-reflection thin film coating 39 applied (preferably by vapor deposition) to the front surface of third glass substrate 35. Coating 39, which is typically about 1-2 microns thick, may be made of, for example, magnesium fluoride and/or quartz.

Display 11 further includes a backlight 41, which may be conventional in nature, positioned behind second glass substrate 15.

Display 11 may be used in the conventional manner. Because of its construction, display 11 exhibits improved optical viewing performance.

It should be understood that, although substrates 35, 13 and 15 of display 11 are made of glass, one could replace one or more of substrates 35, 13 and 15 with a non-glass transparent material, such as a polycarbonate or a like plastic; however, said replacement(s) would likely render the display unsuitable for most military applications—but not unsuitable for most commercial applications.

Figure 3:
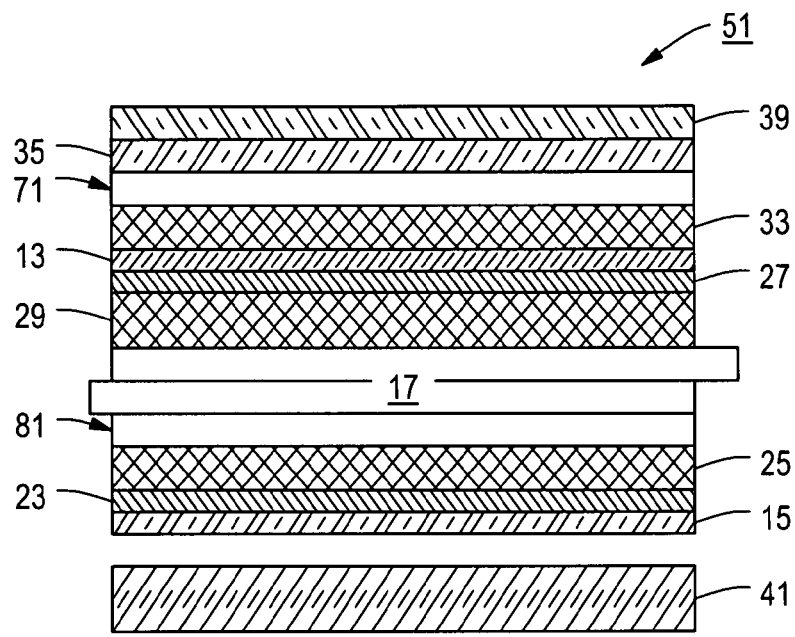
FIG. 3 is a schematic section view of a second embodiment of a liquid crystal display constructed according to the teachings of the present invention.

Referring now to FIG. 3, there is shown a schematic section view of a second embodiment of a liquid crystal display constructed according to the teachings of the present invention, said liquid crystal display being represented generally by reference numeral 51.

Display 51, which is also particularly well-suited for (but not limited to) use in military applications, is similar in many respects to display 11, the principal differences between the two displays being that, in display 51, the combination of front polarizer 31 and adhesive 37 of display 11 are replaced with a polarizer assembly 71 and the combination of polarizer 19 and adhesive 21 of display 11 are replaced with a polarizer assembly 81.

Figure 4:
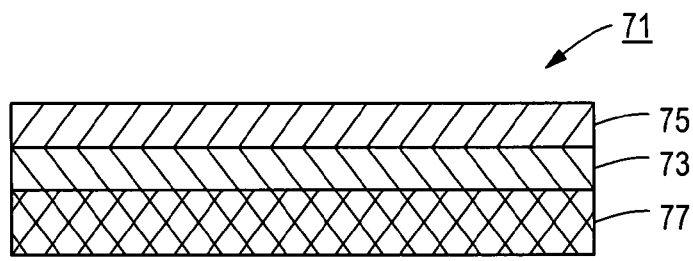
FIG. 4 is a schematic section view of one of the polarizer assemblies present in the liquid crystal display of FIG. 3, said polarizer assembly being constructed according to the teachings of the present invention.

Referring now to FIG. 4, polarizer assembly 71 is shown in greater detail. Polarizer assembly 71 comprises a neutral density polarizer 73, which may be conventional in nature. An index-matched, pressure sensitive adhesive 75, which may be conventional in nature, is applied to one side of polarizer 73, and a wide viewing angle film 77 (also known as a compensation film), which may be conventional in nature, is applied to the opposite side of polarizer 73.

In display 51, adhesive 75 is contacted with substrate 35, with film 77 adhered to material 33.

Figure 5:
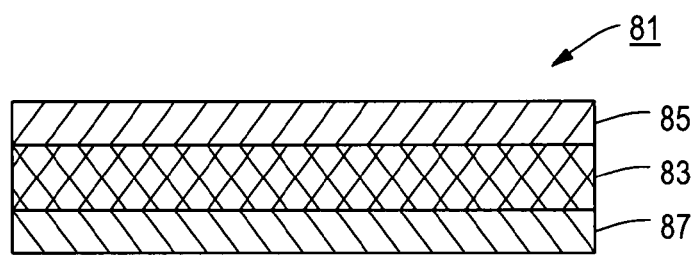
FIG. 5 is a schematic section view of the other of the polarizer assemblies present in the liquid crystal display of FIG. 3, said polarizer assembly being a conventional polarizer assembly.

Referring now to FIG. 5, polarizer assembly 81 is shown in greater detail. Assembly 81, which is conventional, comprises a wide viewing angle film 83, which may be identical to film 77. An index-matched, pressure sensitive adhesive 85, which may be identical to adhesive 75, is applied to one side of film 83, and a neutral density polarizer 87, which may be identical to polarizer 73 but is crossed relative thereto, is applied to the opposite side of film 83.

In display 51, adhesive 85 of assembly 81 is placed in contact with panel 17, with polarizer 87 adhered to optical bonding material 25.

One advantage to replacing polarizers 31 and 19 (and their associated pressure sensitive adhesives 37 and 21, respectively) with assemblies 71 and 81, respectively, is that films 77 and 83 serve to counter the birefringent effect of the liquid crystal material in panel 17, thereby improving the viewing characteristics of the display at wide angles.

Figure 6:
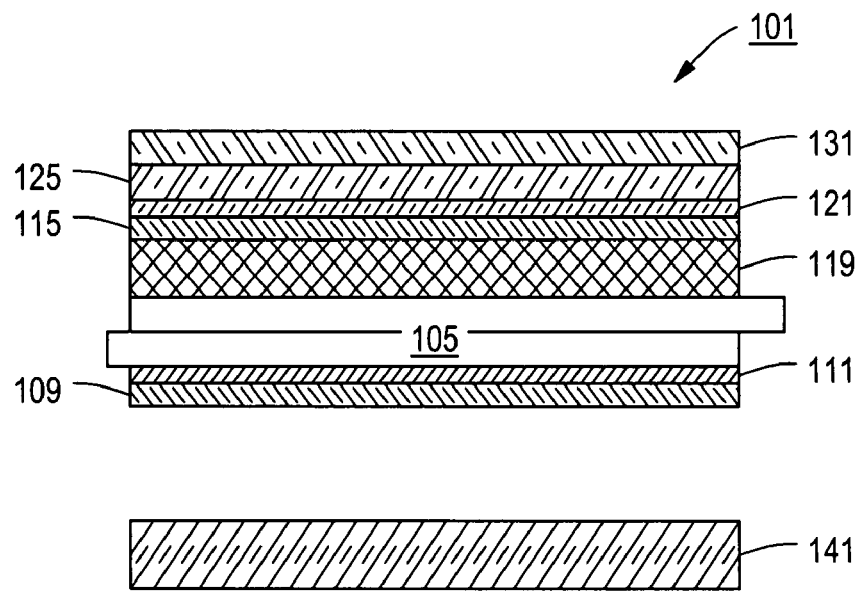
FIG. 6 is a schematic section view of a third embodiment of a liquid crystal display constructed according to the teachings of the present invention.

Referring now to FIG. 6, there is shown a schematic section view of a third embodiment of a liquid crystal display constructed according to the teachings of the present invention, said liquid crystal display being represented generally by reference numeral 101.

Display 101, which is particularly well-suited for non-military or commercial applications (e.g., cell phone screens, laptop monitors), comprises a liquid crystal display (LCD) panel 105, LCD panel 105 being identical to LCD panel 17 of display 11.

Display 101 also comprises a rear polarizer 109. The front surface of rear polarizer 109 is adhered to the rear surface of LCD panel 105 with an index-matched, pressure-sensitive adhesive 111. Polarizer 109 and adhesive 111 may be identical to polarizer 19 and adhesive 21, respectively, of device 11 and may be manufactured together in the form of a polarizer assembly.

Display 101 additionally comprises a front polarizer 115, front polarizer 115 being crossed relative to rear polarizer 109. The rear surface of front polarizer 115 is adhered to the front surface of LCD panel 105 by a layer 119 of an index-matched, optical bonding material, and an index-matched pressure sensitive adhesive 121 is applied to the front surface of front polarizer 115. Polarizer 115 and adhesive 121 may be identical to polarizer 31 and adhesive 37, respectively, of device 11 and may be manufactured together in the form of a polarizer assembly.

Display 101 additionally comprises a transparent cover 125, cover 125 preferably having an index of refraction substantially matching that of front polarizer 115. The rear surface of cover 125 is preferably bonded to the front of polarizer 115 by adhesive 121. Cover 125 is preferably made of a suitable plastic, such as a polycarbonate, but can also be made of a glass (it being understood that glass is less suitable for many commercial applications).

Display 101 preferably further includes a conventional anti-reflection thin film coating 131 applied to the front surface of cover 125. Coating 131 may be identical to coating 39 of device 11.

It is to be understood that, where cover 125 is made of plastic, coating 131 may be omitted and cover 125 may, instead, be textured to reduce glare.

Display 101 preferably further includes a backlight 141, which may be conventional in nature, positioned behind polarizer 109.

As can readily be appreciated, polarizer 115 and adhesive 121 of display 101 may be replaced with assembly 71, with polarizer 109 and adhesive 111 of display 101 also being replaced with assembly 81.

As can also readily be appreciated, display 101 could include EMI shield 27 and/or heating element 23; however, for most commercial applications, such components would be unnecessary.

Figure 7:
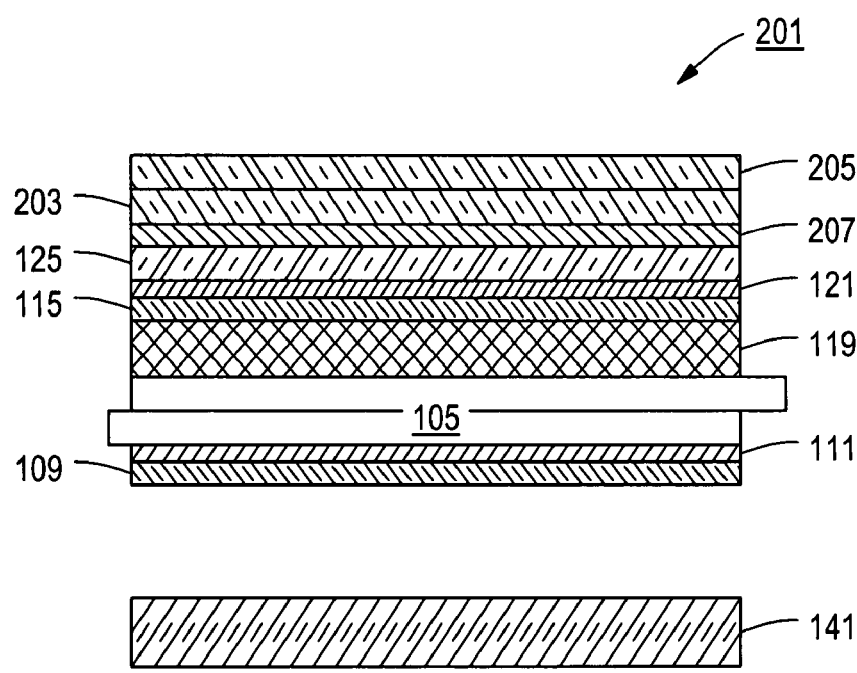
FIG. 7 is a schematic section view of a fourth embodiment of a liquid crystal display constructed according to the teachings of the present invention.

Referring now to FIG. 7, there is shown a schematic section view of a fourth embodiment of a liquid crystal display constructed according to the teachings of the present invention, said liquid crystal display being represented generally by reference numeral 201.

Display 201 is substantially identical to display 101, the principal difference between the two displays being that display 201, instead of having an anti-reflection (AR) coating 131 applied directly to the front surface of cover 125, comprises a transparent thin film 203 having an anti-reflection coating 205 applied to its front surface and an index-matched, pressure-sensitive adhesive 207 applied to its rear surface, adhesive 207 being in direct contact with the front surface of cover 125.

As can readily be appreciated, polarizer 115 and adhesive 121 of display 201 may be replaced with assembly 71, with polarizer 109 and adhesive 111 of display 201 also being replaced with assembly 81.

As can also readily be appreciated, displays 11 and 51 could also be modified by replacing coating 131 with the combination of film 203, coating 205 and adhesive 207.

Figure 8:
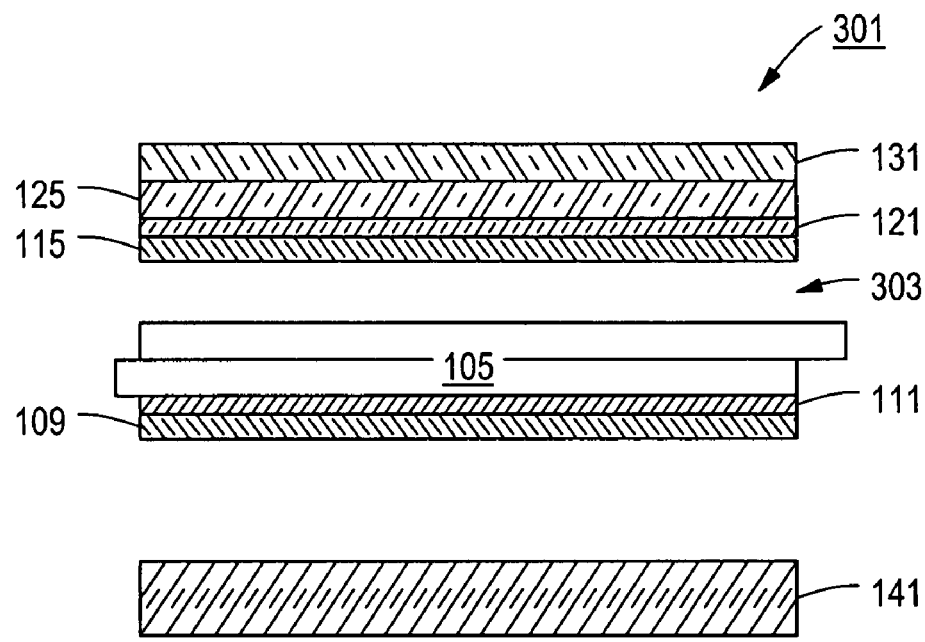
FIG. 8 is a schematic section view of a fifth embodiment of a liquid crystal display constructed according to the teachings of the present invention.

Referring now to FIG. 8, there is shown a schematic section view of a fifth embodiment of a liquid crystal display constructed according to the teachings of the present invention, said liquid crystal display being represented generally by reference numeral 301.

Display 301 is similar in many respects to display 101, the principal difference between the two displays being that display 301 does not include layer 119 of optical bonding material between front polarizer 115 and LCD panel 105; instead, in display 301, polarizer 115 and panel 105 are spaced apart by an air gap 303.

As can readily be appreciated, polarizer 115 and adhesive 121 of display 301 may be replaced with assembly 71, with polarizer 109 and adhesive 111 of display 301 also being replaced with assembly 81.

Figure 9:
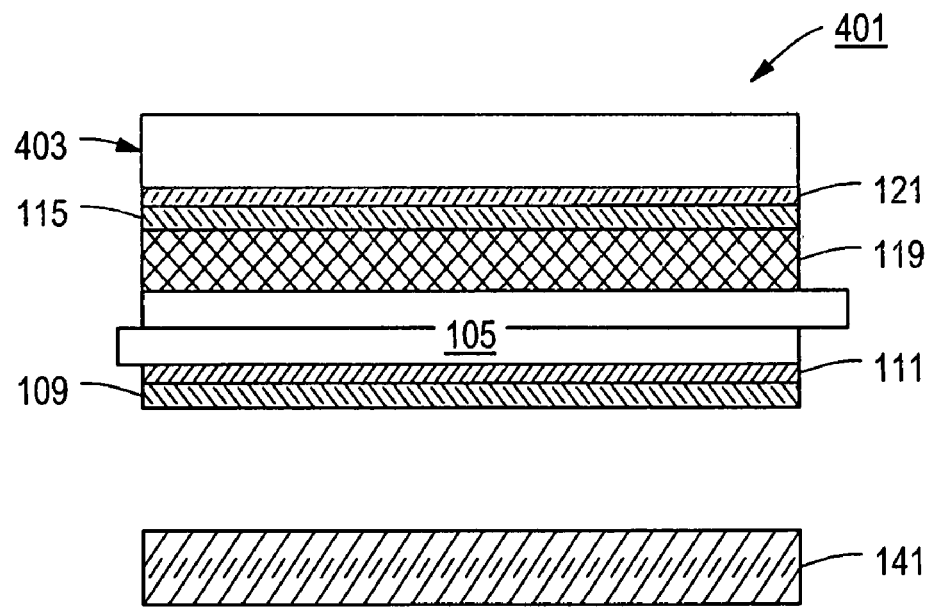
FIG. 9 is a schematic section view of a sixth embodiment of a liquid crystal display constructed according to the teachings of the present invention.

Referring now to FIG. 9, there is shown a schematic section view of a sixth embodiment of a liquid crystal display constructed according to the teachings of the present invention, said liquid crystal display being represented generally by reference numeral 401.

Display 401 is similar in many respects to display 101, the principal difference between the two displays being that, in display 401, cover 125 and coating 131 are replaced with a touch panel 403. Touch panel 403 may be conventional in nature and may be, for example, the type of touch panel found in a PALM PILOT™ personal organizer or the like.

As can readily be appreciated, polarizer 115 and adhesive 121 of display 401 may be replaced with assembly 71, with polarizer 109 and adhesive 111 of display 401 also being replaced with assembly 81.

Where touch panel 403 is of the type having a front surface onto which an AR-coated thin film may be adhered with an index-matched, pressure-sensitive adhesive (as in display 201), display 401 preferably further includes such an AR-coated film assembly adhered to the front of touch panel 403. In addition, where such an AR-coated film assembly is adhered to the front of touch panel 403, polarizer 115 may also be moved from its position behind touch panel 403 to a position in front of said AR-coated film assembly.

As can readily be appreciated, display 301 could be modified in a manner similar to that described above for display 401 wherein cover 125 and coating 131 are replaced with a touch panel like touch panel 403.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A liquid crystal display comprising:
   (a) a liquid crystal display panel;
   (b) a touch panel positioned in front of said liquid crystal display panel, wherein said touch panel is bonded to said liquid crystal display panel with an index-matched optical bonding material;
   (c) a rear polarizer positioned behind said liquid crystal display panel;
   (d) a first wide viewing angle film, said first wide viewing angle film being positioned between said rear polarizer and said liquid crystal display panel;
   (e) a single front polarizer positioned in front of said touch panel, wherein the rear polarizer and the single front polarizer are orthogonal to one another;
   (f) a second wide viewing angle film, said second wide viewing angle film being positioned between said single front polarizer and said liquid crystal display panel; and
   (g) a backlight, said backlight being positioned behind said rear polarizer.

2. The liquid crystal display as claimed in claim 1 wherein said liquid crystal display panel comprises a first transparent substrate, a second transparent substrate, liquid crystal material positioned between said first and second transparent substrates, a first transparent electrode positioned between said liquid crystal material and said first transparent substrate, and a second transparent electrode positioned between said liquid crystal material and said second transparent substrate.

3. A liquid crystal display comprising:
   (a) a liquid crystal display panel;
   (b) a touch panel positioned in front of said liquid crystal display panel, wherein said touch panel is bonded to said liquid crystal display panel with an index-matched optical bonding material;
   (c) a first polarizer assembly positioned behind said liquid crystal display panel, the first polarizer assembly including a first wide angle viewing film and a rear polarizer positioned behind the first wide angle viewing film; and
   (d) a second polarizer assembly positioned in front of said touch panel, the second polarizer assembly including a second wide viewing angle film and a single front polarizer positioned behind the second wide angle viewing film, wherein the rear polarizer and the single front polarizer are orthogonal to one another.

4. The liquid crystal display as claimed in claim 3, wherein said liquid crystal display panel comprises a first transparent substrate, a second transparent substrate, liquid material positioned between said first and second transparent substrates, a first transparent electrode positioned between said liquid crystal material and said first transparent substrate, and a second transparent electrode positioned between said liquid crystal material and said second transparent substrate.

5. The liquid crystal display as claimed in claim 3, further comprising a backlight, said backlight being positioned behind said rear polarizer.

6. The liquid crystal display as claimed in claim 1, wherein the second wide viewing angle film is substantially identical to the first wide viewing angle film.

7. The liquid crystal display as claimed in claim 1, wherein the index-matched optical bonding material is pressure sensitive.

* * * * *